April 21, 1964
W. I. UYEHARA
3,129,780
WHEELED TRACTOR CONSTRUCTION
Filed April 11, 1961
3 Sheets-Sheet 1
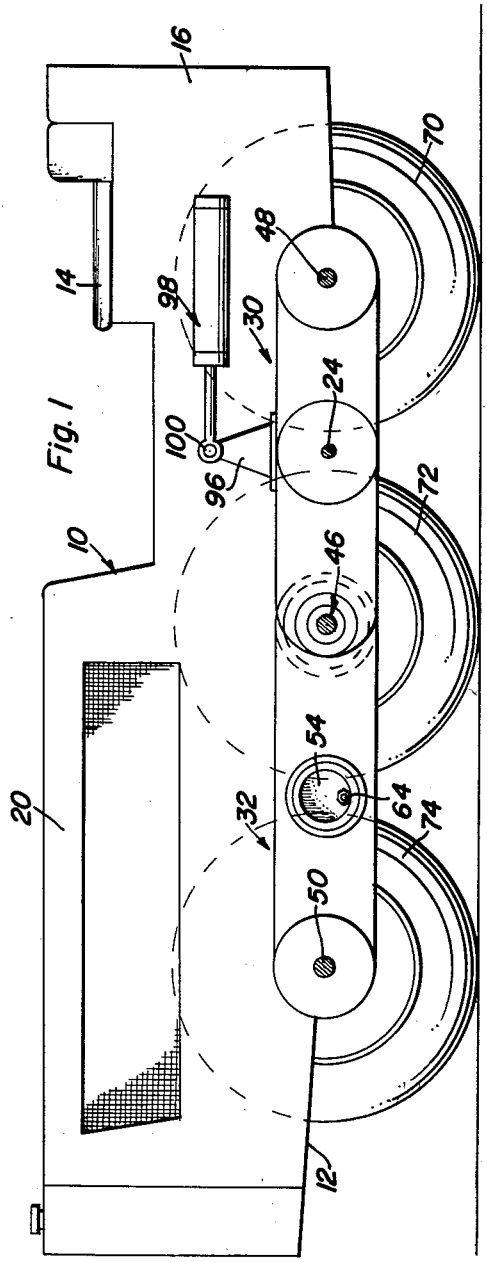
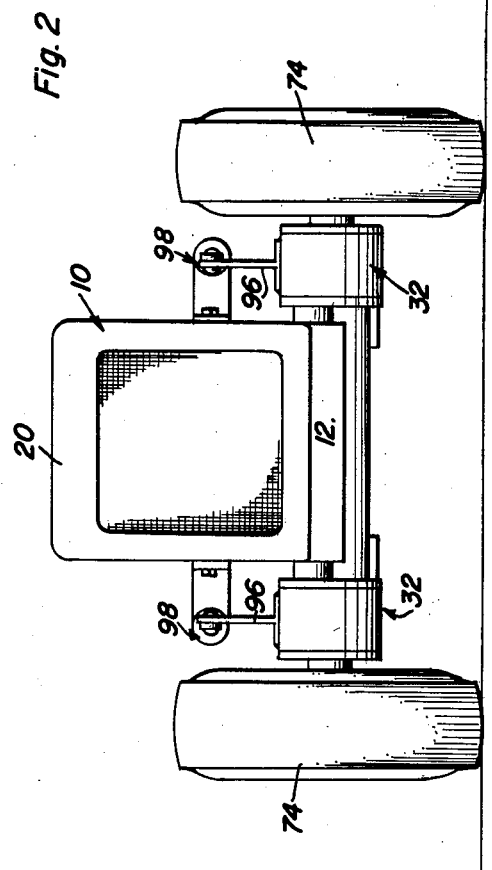
William I. Uyehara
INVENTOR.

April 21, 1964

W. I. UYEHARA 3,129,780

WHEELED TRACTOR CONSTRUCTION

Filed April 11, 1961

William I. Uyehara
INVENTOR.

BY
Attorneys

April 21, 1964
W. I. UYEHARA
3,129,780
WHEELED TRACTOR CONSTRUCTION
Filed April 11, 1961
3 Sheets-Sheet 3
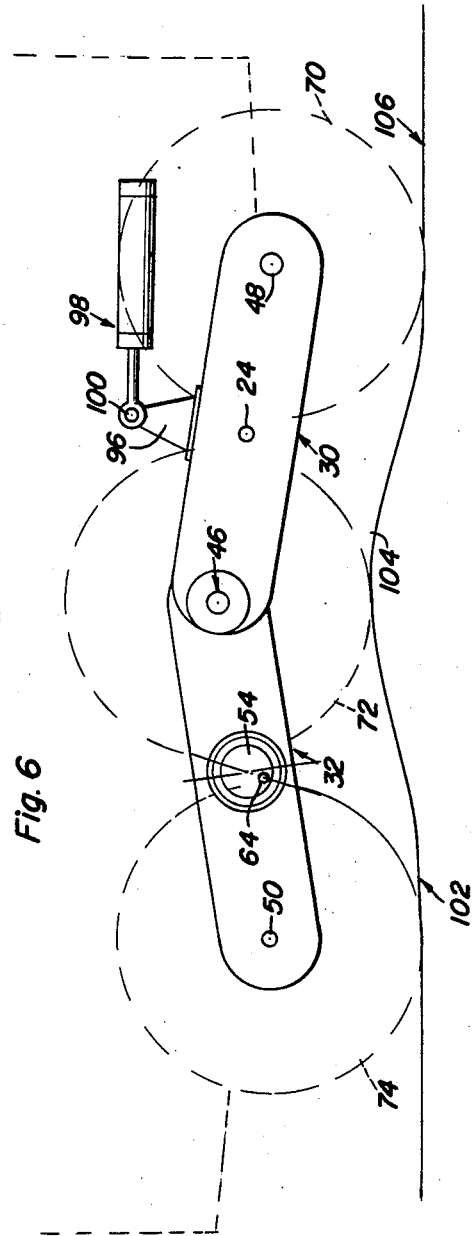
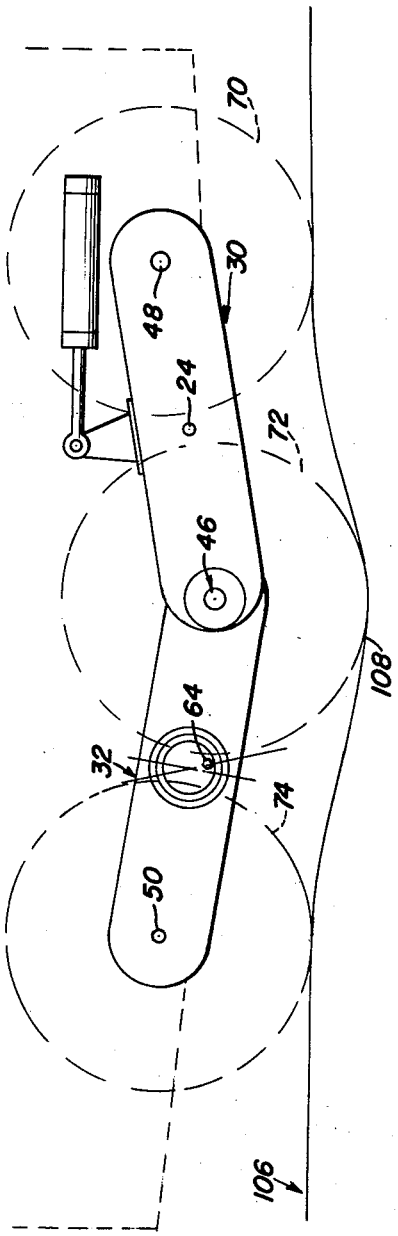
William I. Uyehara
INVENTOR.

United States Patent Office 3,129,780
Patented Apr. 21, 1964

3,129,780
WHEELED TRACTOR CONSTRUCTION
William I. Uyehara, 2522 Date St., Honolulu 14, Hawaii
Filed Apr. 11, 1961, Ser. No. 102,252
11 Claims. (Cl. 180—23)

This invention relates to novel and useful improvements in wheeled tractor constructions and more particularly to a means for mounting three or more driving wheels on each side of a tractor in longitudinal alignment with each other in a manner whereby each of the three wheels on each side of the tractor is mounted for vertical movement relative to the tractor in order that the latter may travel over rough terrain while maintaining all of its six driving wheels in engagement with the terrain over which it is traveling.

Previously wheeled tractor constructions having more than two driving wheels on each side of the tractor have had to utilize separate means for applying power to each of the driving wheels of the tractor. In some cases pairs of wheels have been supported by opposite ends of pivotally mounted walking beam axle assemblies and in this instance it is necessary that the driving power from the tractor prime mover be transmitted to each of the walking beam assemblies separately in order that the driving wheels of each walking beam may be drivingly connected to the prime mover. Although it is possible to provide a wheeled tractor with two pairs of driving wheels supported by opposite ends of a pair of walking beam assemblies, if the tractor includes only one walking beam assembly on each side, means must be provided for preventing excess pivotal movement of the body of the tractor relative to the walking beam assemblies. However, with the use of a pair of walking beam assemblies on each side of a tractor and by pivotally securing adjacent ends of the walking beam of each pair of beams together and rotatably supporting drive wheels at the remote ends of each pair of walking beams and a center drive wheel at adjacent ends of the walking beams of each pair which are pivotally secured together, the tractor construction need not be provided with springs or other means for limiting pivotal movement of the tractor frame relative to the walking beams. Additionally, the use of springs is not required inasmuch as the pivotal joint between the walking beams of each pair will enable the three driving wheels supported by each pair of walking beams to readily conform to an irregular terrain. If the walking beams of each pair are pivotally secured to the tractor frame at their midportions, the midportions of the walking beams will be maintained in vertical position relative to the tractor frame and the driving wheels supported by the opposite ends of the walking beams will be mounted for vertical movement relative to the tractor frame thereby enabling one driving wheel on one side of the tractor to pass over a high portion of the terrain upon swinging the other wheels on that side of the tractor downwardly.

However, if the walking beams of each pair are pivotally secured to the tractor frame at their midportions for movement about transversely extending horizontally disposed axes, it is necessary that the means by which one of the beams is pivotally secured to the tractor frame also include means enabling displacement of the corresponding axis of rotation longitudinally of the tractor frame inasmuch as the distance between the remote ends of each pair of walking beams will be decreased as the walking beams are pivoted relative to each other away from a position in direct longitudinal alignment with each other.

Accordingly, it is the main object of this invention to provide a wheeled tractor construction utilizing a pair of walking beam axle supporting assemblies on each side of the tractor with adjacent ends of the walking beams of each pair pivotally secured together and ground engaging wheels carried by the remote ends of each pair of walking beams and a ground engaging wheel carried by the adjacent ends of each pair of walking beams with a means being provided for enabling displacement of one of the axes of rotation of the walking beams longitudinally of the tractor frame.

A further object of this invention, in accordance with the immediately preceding object, is to provide a means for mounting the center drive wheel of each pair of walking beam assemblies for movement about an axis coinciding with the axis of rotation established by the pivotal connection of the walking beams with each other.

Still another object of this invention is to mount the one beam not mounted for displacement longitudinally of the tractor frame by means of a driving shaft drivingly connected to the prime mover of the tractor whereby the driving shaft may be readily drivingly connected to wheel driving shafts carried by the adjacent ends of the walking beams and the remote ends thereof whereby the driving shaft may be readily drivingly connected to the wheel driving shafts by means of endless flexible members.

A still further object of this invention is to provide a tractor construction with hollow walking beam assemblies whereby the endless flexible members drivingly connecting the driving shaft with the wheel driving shafts may be completely enclosed within the walking beam assemblies.

A final object to be specifically enumerated herein is to provide a wheeled tractor construction which will conform to conventional manufacture, be of simple construction and be relatively trouble free in operation so as to provide a device that will be economically feasible, long lasting free of the usual mechanical disadvantages normally inherent in wheeled tractor constructions utilizing the walking beam axle assemblies that support a plurality of driving wheels.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the tractor construction of the instant invention, parts thereof being broken away and shown in section;

FIGURE 2 is a front elevational view of the tractor construction;

FIGURES 6 and 7 are diagrammatic views showing the manner in which the walking beam axle assemblies may be pivoted relative to each other during movement of the tractor over rough terrain.

Figure 3:
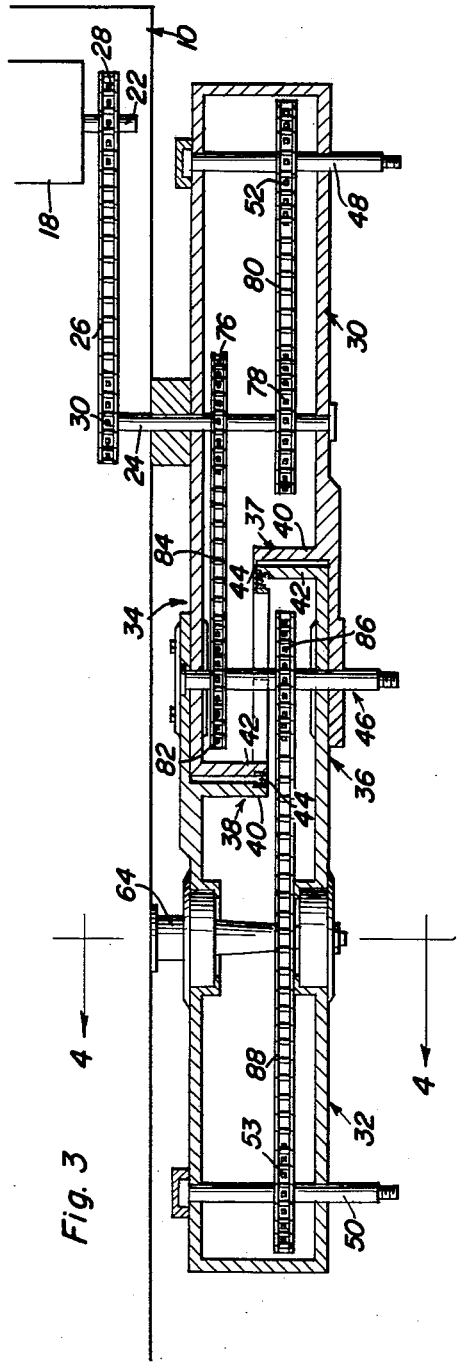
FIGURE 3 is a fragmentary enlarged horizontal sectional view of one walking beam axle assembly of the tractor with some parts of the assembly being shown diagrammatically.

Referring now more specifically to the drawings the numeral 10 generally designates the tractor construction of the instant invention. A tractor construction including a frame 12 and a driver's seat 14 from which the tractor may be driven. Secured to the frame 12 is a body 16 and it may be observed from FIGURE 3 of the drawings that the tractor 10 also includes a conventional transmission 18 which is drivingly connected to a prime mover (not shown) beneath the hood 20 of the body 16. The transmission 18 includes a pair of output shafts 22. The output shafts 22 extend from opposite sides of the transmission 18 and are drivingly connected to a pair of transverse shafts 24 which are journaled for rotation from the frame 12 in any convenient manner. The transverse shafts 24 are drivingly connected to the output shafts 22 by means of an endless chain 26 entrained about pairs of aligned sprocket wheels 28 and 30 carried by the output and transverse shafts 22 and 24 respectively.

Carried by each side of the tractor 10 is a pair of longitudinally extending support beams which are generally referred to by the reference numerals 30 and 32. Each of the support beams 30 and 32 are hollow and include overlapped end portions generally referred to by the reference numerals 34 and 36. The overlapped end portions 34 and 36 include transversely opening and opposing notches 37 and 38 respectively which define overlapped tongue and groove portions including pairs of arcuate confronting bearing supports 40 and 42. Bearing members 44 are disposed between each pair of confronting bearing supports 40 and 42. It will be noted from FIGURES 3 and 5 of the drawings that a transverse shaft member generally referred to by the reference numeral 46 is journaled for rotation about an axis extending through the overlapped end portions 34 and 36. It is to be noted that the axis of rotation of the transverse shaft member 46 coincides with the center of the arcuate bearing supports 40 and 42. In this manner, the transverse shaft member 46 is journaled for rotation about an axis coinciding with the axis of rotation of the pivotal connection between the support beams 30 and 32.

A pair of transverse axle members are carried by and journaled for rotation about axes extending transversely of the remote ends of the support beams 30 and 32. The transverse axles 48 and 50 have sprocket wheels 52 and 53 secured thereto for rotation with the transverse axles 48 and 50 respectively. The outer end of each transverse shaft 24 is journaled for rotation in the corresponding support beam 30 for movement about an axis extending transversely of the support beam 30 as can best be seen in FIGURE 3 of the drawings.

The support beam 32 has a circular and outwardly opening recess 54 formed in opposite sides thereof and a pair of inner and outer disks 56 and 58 are rotatably journaled in the recesses 54 and maintained captive therein by means of retaining rings 60 and 62 respectively. A pair of stub axles 64 are carried by opposite sides of the frame 12 and are rigidly secured to the latter. The other ends of the stub axles 64 are rotatably received through the corresponding disks 56 and 58 by means of bores 65 and 66. The bores 65 and 66 are each equally spaced from the center of the disks 56 and 58, and each outer disk 58 is provided with an outwardly and axially extending stub shaft 68.

Drive wheels 70, 72 and 74 are fixedly secured to the outer ends of the transverse axles 48, transverse shaft member 46 and transverse axle 50, respectively. The portion of the transverse shaft 24 disposed within the support means 30 is provided with a pair of sprocket wheels 76 and 78 and the sprocket wheel 78 is aligned with the sprocket wheel 52 and drivingly connected thereto by means of an endless chain 80. The sprocket wheel 76 is aligned with a sprocket wheel 82 carried by the inner end of the transverse shaft member 46 and the sprocket wheels 76 and 82 are drivingly connected by means of an endless chain 84. The outer end portion of the transverse shaft member 46 has a sprocket wheel 86 secured thereto which is in alignment with the sprocket wheel 54 and drivingly connected thereto by means of an endless chain 88.

Figure 5:
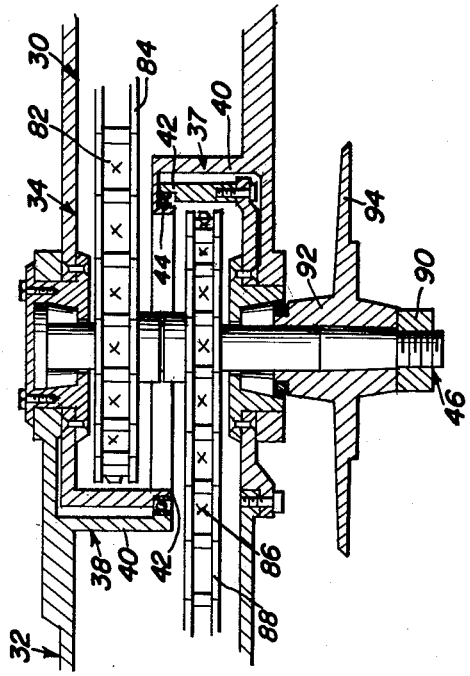
FIGURE 5 is an enlarged fragmentary horizontal sectional view showing the center portion of FIGURE 3 on somewhat of a larger scale and more clearly illustrating the manner in which the walking beam axle assemblies are pivotally secured together for rotation about an axis coinciding with the axis of rotation of the center wheel driving shaft.
Figure 4:
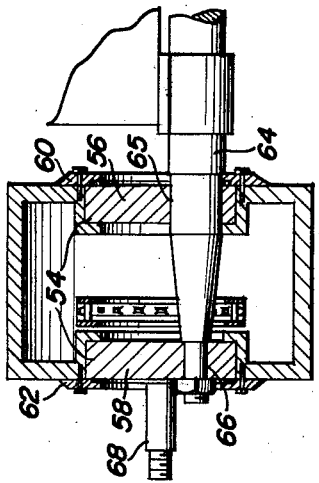
FIGURE 4 is a fragmentary enlarged vertical sectional view taken substantially upon the plane indicated by the section line 4—4 of FIGURE 3.

With attention now directed to FIGURE 5 of the drawings it will be seen that each of the wheels 70, 72 and 74 may be secured to its respective shaft and axle by means of a threaded fastener 90 disposed outwardly of the hub 92 of the respective wheel rim 94. Additionally, each of the support beams 30 is provided with an upstanding support 96 to which one end of a shock absorber generally referred to by the reference numeral 98 is pivotally secured as at 100. The other end of the shock absorber 98 may be pivotally secured to the body 16 of the tractor 10 in any conventional manner.

In operation, power is delivered to each transverse shaft 24 which in turn drives the corresponding transverse axles 48 and 50 and the corresponding transverse shaft member 46. Accordingly, the wheels 70, 72 and 74 are each drivingly connected to the transmission 18. Inasmuch as the axis of rotation of the pivotal connection between each pair of support beams 30 and 32 coincides with the axis of rotation of the corresponding support shaft member 46 on which the sprocket wheels 82 and 86 are secured, pivotal movement of the support beams 30 and 32 relative to each other will not effect the tensioning of the endless chains 80, 84 and 88. Additionally, inasmuch as the stub axles 64 are rotatably received in the bores 65 and 66, as the support beams 30 and 32 pivot from longitudinally aligned positions, the disks 56 and 58 will rotate within their respective recesses 54 in order to enable longitudinal displacement of the axis of rotation of the support beams 32.

With attention now directed to FIGURES 6 and 7 of the drawings it will be noted that as the center wheel 72 on each side of the tractor 10 moves an elevated portion 104 of the ground generally referred to by the reference numeral 102, the wheels 70 and 74 will be lowered upon downwardly swinging movement of the remote ends of the corresponding support beams 30 and 32. Additionally, as the center wheels 72 on each side of the tractor 10 are lowered into a depression 108 in the ground 102, the corresponding wheels 70 and 74 will be raised by upward swinging movement of the remote ends of the support beams 30 and 32. Thus, it will be noted that as the tractor 10 moves over all but extremely rough terrain that all of the wheels 70, 72 and 74 will be maintained in engagement with the ground thereby enabling the tractor 10 to maintain all of its supporting wheels in driving engagement with the ground over which it is traveling. Inasmuch as the wheels 70, 72 and 74 on each side of the tractor 10 are supported by means of the support beams 30 and 32 in the manner hereinbefore set forth, the support beams 30 and 32 need not be provided with spring means for yieldably retaining the support beams in aligned positions. However, the shock absorber 98 may be provided if desired.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A wheeled tractor construction comprising a longitudinal extending frame, front and rear longitudinally extending support beams defining one pair of beams on each side of said frame, first means pivotally securing adjacent ends of the front and rear beams of each pair of beams together, second means pivotally securing one set of corresponding beams of said pairs of beams to the corresponding sides of said tractor frame for rotation about axes extending transversely of the midportions of said one set of beams intermediate their opposite ends and third means pivotally securing the other set of corresponding beams of said pairs of beams to said frame for rotation about axes fixed relative to said frame against shifting longitudinally of said frame and extending transversely of the midportions of said pairs of beams intermediate their opposite ends, a support wheel rotatably supported from each of the remote ends of said pairs of front and rear beams and from each pair of adjacent ends of said beams for rotation about axes extending transversely of said beams, at least one of said wheels carried by each pair of said beams comprising a drive wheel, said second means including means enabling displacement of the axes of rotation of said one set of beams longitudinally of said frame.

2. The combination of claim 1 including shock absorber means secured between at least one beam of each pair of beams and said frame.

3. The combination of claim 1 wherein the axes of rotation of said one set of beams are aligned.

4. The combination of claim 1 wherein the axes of rotation established by said first pivotal securing means coincide with the axes of rotation of the support wheels rotatably supported from the pairs of adjacent ends of said beams.

5. The combination of claim 1 including means drivingly connecting the support wheels carried by each pair of support beams.

6. The combination of claim 1 wherein the adjacent ends of each pair of beams include overlapped end portions, said first pivotal securing means comprising a transverse shaft member having longitudinally spaced portions journaled in said overlapped end portions.

7. The combination of claim 1 wherein said beams are hollow and said first means comprises the adjacent end portions of said beams which are overlapped and include transversely opening and opposing notches defining overlapped tongue and groove portions including arcuate confronting bearing means having the axis of rotation of the pivotal connection of the beams of each pair of beams as their center.

8. The combination of claim 7 wherein said first pivotal securing means further includes a transverse shaft member having longitudinally spaced portions journalled in said overlapped end portions, a transverse axle journaled for rotation in each of the remote ends of the beams of each pair of beams, one of said support wheels secured to an extended end portion of each of said transverse shaft members and transverse axles.

9. The combination of claim 8 including means drivingly connecting said transverse shaft member and the transverse axles of each pair of beams, said tractor including a prime mover, means including the last mentioned means drivingly connecting said transverse shaft members to said prime mover.

10. The combination of claim 1 wherein said second pivotal securing means each includes a disk journalled for rotation in the corresponding beam about a transverse axis and a rigid support shaft carried by the corresponding side of said frame having an outer end portion eccentrically journalled in the corresponding disk for rotation about an axis of rotation generally paralleling the axis of rotation of that disk.

11. The combination of claim 1 wherein said beams are hollow and said first means comprises the adjacent end portions of said beams which are overlapped and include transversely opening and opposing notches defining overlapped tongue and groove portions including arcuate confronting bearing means having the axis of rotation of the pivotal connection of the beams of each pair of beams as their center, said first pivotal securing means further including a transverse shaft member having longitudinally spaced portions journaled in said overlapped end portions, a transverse axle journalled for rotation in each of the remote ends of the beams of each pair of beams, one of said support wheels secured to an extended end portion of each of said transverse shaft members and transverse axles, means drivingly connecting said transverse shaft member and the transverse axles of each pair of beams, said tractor including a prime mover, means including said drivingly connecting means drivingly connecting said transverse shaft members to said prime mover, each of said third pivotal securing means comprising a transverse shaft journalled in said frame and rotatably journalled in the other set of corresponding beams, said means drivingly connecting each transverse shaft member and the corresponding transverse axles including a sprocket wheel secured to each of said transverse axles, first and second sprocket wheels secured to each of said transverse shaft members, first and second sprocket wheels secured to each of said transverse shafts, an endless chain entrained about the first sprocket wheel of each shaft member and the transverse axle sprocket wheel on the front beam member, an endless chain entrained over the first sprocket wheel of each shaft and the sprocket wheel secured to the other of said axles, and an endless chain entrained over the second sprocket wheel of each shaft and the second sprocket wheel of the corresponding shaft member.

References Cited in the file of this patent

UNITED STATES PATENTS

| | | |
|---|---|---|
| 2,024,148 | Dahl | Dec. 17, 1935 |
| 2,642,144 | Brewer | June 16, 1953 |

FOREIGN PATENTS

| | | |
|---|---|---|
| 359,322 | Italy | May 18, 1938 |
| 1,094,603 | Germany | Dec. 8, 1960 |